(12) United States Patent
Lotfi et al.

(10) Patent No.: US 12,215,269 B1
(45) Date of Patent: Feb. 4, 2025

(54) CHIRAL AZOBENZENE DOPANTS WITH INCREASED DELTA HELICAL TWISTING POWER

(71) Applicant: Nissan North America, Inc., Franklin, TN (US)

(72) Inventors: Sogol Lotfi, San Jose, CA (US); Manas Likhit Holekevi Chandrappa, Santa Clara, CA (US); Balachandran Gadaguntla Radhakrishnan, Palo Alto, CA (US); Shigemasa Kuwata, Palo Alto, CA (US); Shunta Nabetani, Kanagawa (JP); Yoshimi Ota, Kanagawa (JP); Masanobu Uchimura, Palo Alto, CA (US); Simran Kumari, Los Angeles, CA (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 18/228,496

(22) Filed: Jul. 31, 2023

(51) Int. Cl.
| | |
|---|---|
| *C09K 19/58* | (2006.01) |
| *C09B 31/02* | (2006.01) |
| *C09K 19/02* | (2006.01) |

(52) U.S. Cl.
CPC .......... *C09K 19/586* (2013.01); *C09B 31/025* (2013.01); *C09K 19/0208* (2013.01)

(58) Field of Classification Search
CPC .................................................... C09K 19/58
See application file for complete search history.

(56) References Cited

U.S. PATENT DOCUMENTS 10,619,100 B2  4/2020  He et al.

FOREIGN PATENT DOCUMENTS

| JP | 2018185511 A | 11/2018 |
|---|---|---|
| JP | 2021-26184 A | 2/2021 |

(Continued)

OTHER PUBLICATIONS

Lin, T.-H., Li, Y., Wang, C.-T., Jau, H.-C., Chen, C.-W., Li, C.-C., Bisoyi, H.K., Bunning, T.J. and Li, Q. (2013), Red, Green and Blue Reflections Enabled in an Optically Tunable Self-Organized 3D Cubic Nanostructured Thin Film. Adv. Mater., 25: 5050-5054. https://doi.org/10.1002/adma.201300798 (Year: 2013).*

*Primary Examiner* — Chanceity N Robinson
(74) *Attorney, Agent, or Firm* — Young Basile Hanlon & MacFarlane, P.C.

(57) ABSTRACT

A chiral azobenzene dopant with helical twisting power has a structure represented by the following formula (I):

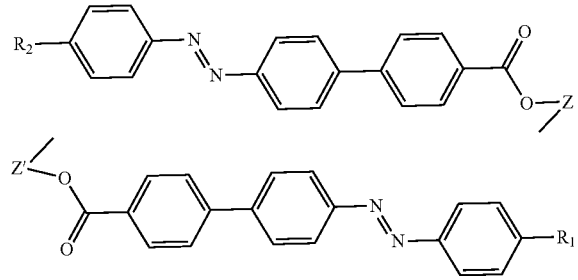

wherein Z and Z' are independently selected from the group consisting of naphthalene and phenanthrene; when Z or Z' is naphthalene, the naphthalene optionally has $R_3$ at the 6 position and $R_4$ at the 6' position; when Z or Z' is phenanthrene, the phenanthrene optionally has $R_3$ at the 7 position and $R_4$ at the 7' position; $R_1$, $R_2$, $R_3$, and $R_4$ are independently selected from the group consisting of an alkyl group having 1 to 20 carbons, an alkoxy group having 1 to 20 carbons, an aryl group having 6 to 20 carbons, and an (Continued)

aryloxy group having 6 to 20 carbons; and on any $R_1$, $R_2$, $R_3$, and $R_4$, on any $CH_2$ a $CH_3$ is optionally attached by replacing a hydrogen on a $CH_2$.

13 Claims, 1 Drawing Sheet

(56) References Cited

FOREIGN PATENT DOCUMENTS

| | | |
|---|---|---|
| JP | 2022098134 A | 7/2022 |
| WO | 2020/028136 A1 | 2/2020 |
| WO | WO-2024053332 A1 * | 3/2024 |

* cited by examiner

CHIRAL AZOBENZENE DOPANTS WITH INCREASED DELTA HELICAL TWISTING POWER

TECHNICAL FIELD

This disclosure relates to chiral azobenzene dopants with increased delta helical twisting power for use in screens, displays and windshields, as non-limiting examples, changing the screen, displays and windshields from transparent to opaque more quickly and completely.

BACKGROUND

Liquid crystal displays are displays containing cholesteric liquid crystal with a chiral dopant. The ability of a chiral dopant to twist a nematic liquid crystal phase into a cholesteric liquid crystal is defined as its helical twisting power (HTP), the cholesteric liquid crystal organized with no positional ordering within layers, and a director axis which varies with layers. Liquid crystal displays are therefore opaque. There is interest in the industry to utilize liquid crystal displays in transparent screens, displays, windows, windshields, and the like, which increases the need for quicker conversion between opaque and transparent and vice versa.

SUMMARY

Disclosed herein are implementations of novel chiral azobenzene dopants with increased delta HTP (ΔHTP). The disclosed chiral azobenzene dopants are mixed with liquid display material to form a liquid display layer. In some implementations, the liquid display layer is used in a screen or window, such as vehicle windshield. The liquid crystal material is quickly reversibly adjustable between transparent and opaque by irradiation. The irradiation can be with visible light and ultraviolet light, respectively.

A chiral azobenzene dopant as disclosed herein with increased ΔHTP has a structure represented by the following formula (I):

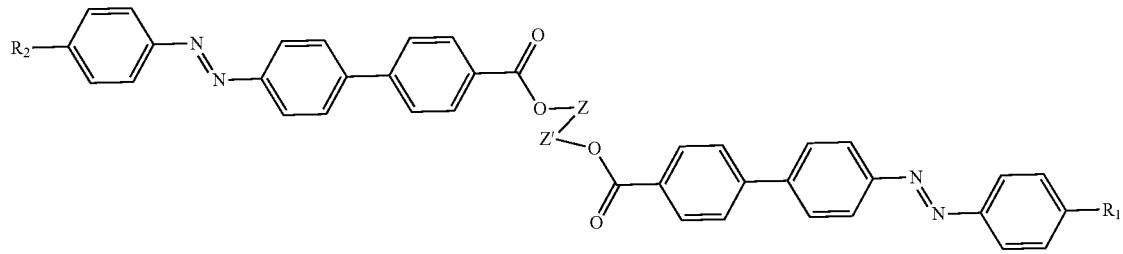

wherein Z and Z' are independently selected from the group consisting of naphthalene and phenanthrene; when Z or Z' is naphthalene, the naphthalene optionally has $R_3$ at the 6 position and $R_4$ at the 6' position; when Z or Z' is phenanthrene, the phenanthrene optionally has $R_3$ at the 7 position and $R_4$ at the 7' position; $R_1$, $R_2$, $R_3$, and $R_4$ are independently selected from the group consisting of an alkyl group having 1 to 20 carbons, an alkoxy group having 1 to 20 carbons, an aryl group having 6 to 20 carbons, and an aryloxy group having 6 to 20 carbons; and for any one or more $R_1$, $R_2$, $R_3$, and $R_4$, on any $CH_2$, a $CH_3$ may be optionally attached by replacing a hydrogen.

The chiral azobenzene dopant may have the structure of formula (Ia):

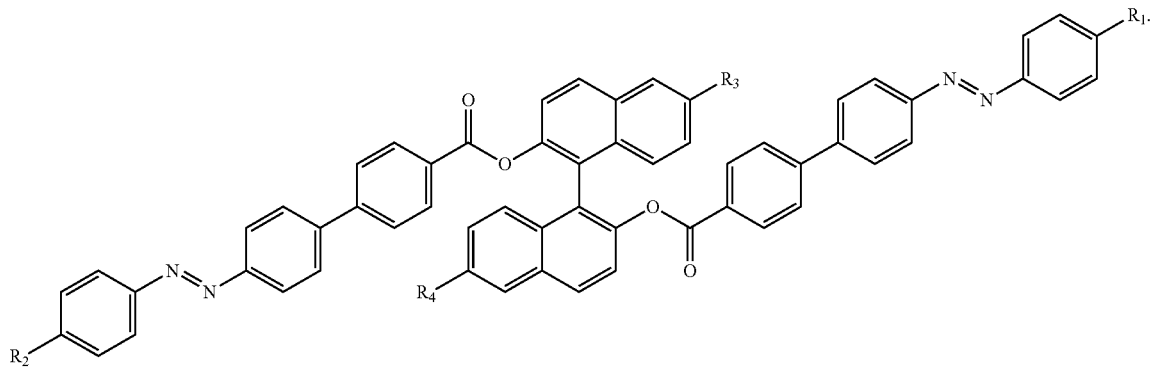

The chiral azobenzene dopant may have the structure of formula (Ib):

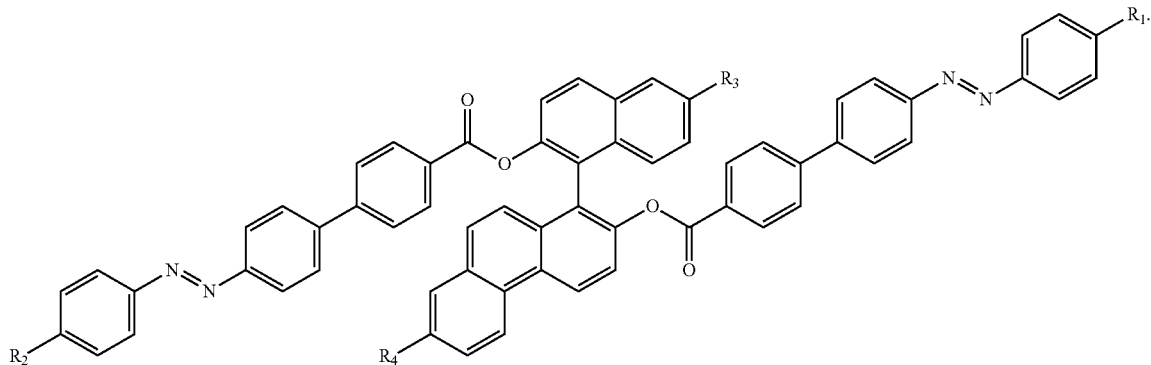

The chiral azobenzene dopant may have the structure of formula (Ic):

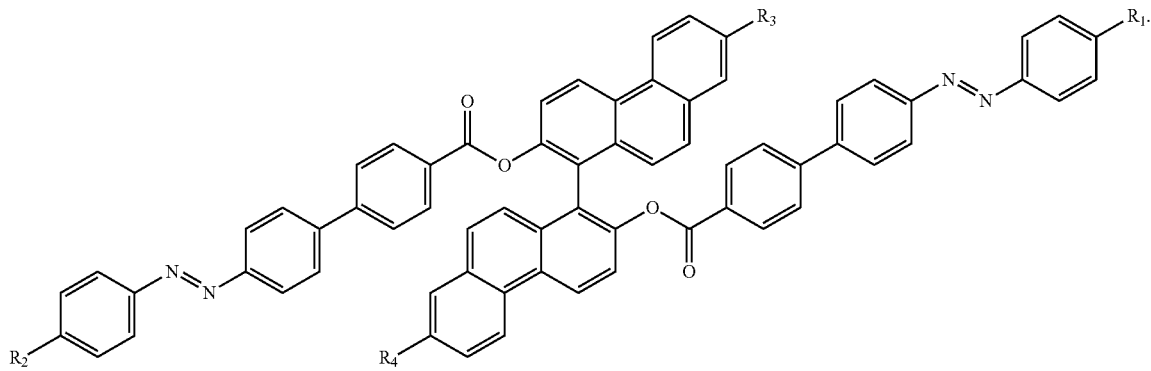

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Cholesteric liquid crystal is generally formulated from a nematic liquid crystal and a chiral dopant, because chiral dopant can induce the transformation of nematic liquid crystal to cholesteric liquid crystal. The HTP of the chiral dopant is a key parameter to evaluate its twisting capacity.

When the chiral dopant is added to the nematic liquid crystal material, the HTP of the chiral dopant is changed by irradiating, thereby expanding the reflection band width of cholesteric liquid crystal device.

In the nematic phase, molecules tend to be aligned parallel, along a symmetry-breaking direction. In the cholesteric phase, the planes with nematic-like ordering are twisted with respect to each other and form a helical structure. The HTP determines the pitch of the helical structure produced by introducing a given concentration of chiral dopant molecules to the nematic liquid-crystal phase.

There is demand for chiral dopants that produce an increased ΔHTP to provide a fast switchable response to irradiation. The chiral dopants also must be designed to address the complex relationships between particular structures, such as vehicle windows, and in particular windshields and the dopant itself. The chiral dopants disclosed herein with increased ΔHTP are developed for use in situations where the change from transparent to opaque and back must be occur quickly and completely.

Figure 1:
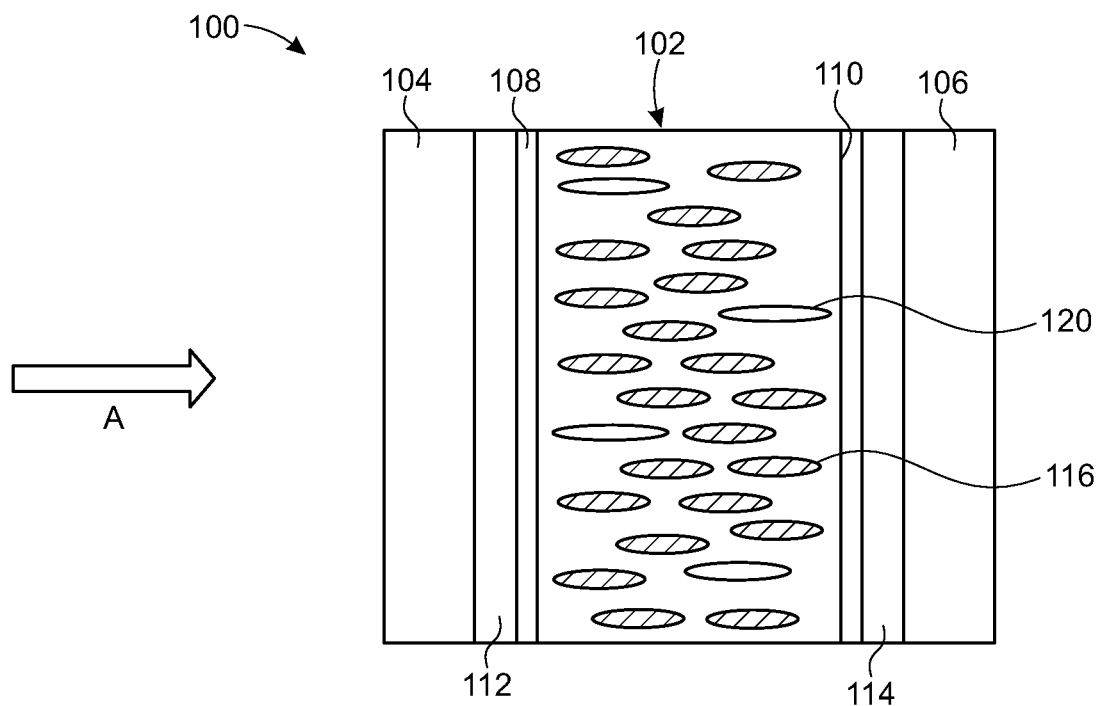
FIG. 1 is a schematic of a window having a liquid crystal layer between two glass panes, the liquid crystal layer containing the disclosed chiral dopant(s), the liquid crystal layer being in the nematic phase rendering the window transparent.

FIG. 1 is a schematic of a window 100, or windshield, having a nematic liquid crystal layer 102 between two glass panes 104, 106. The liquid crystal layer 102 can be laminated with PET film cell 108, 110, as a non-limiting example, and bonded to the glass panes 104, 106 with adhesive layers 112, 114. The adhesive layers can be, as a non-limiting example, poly vinyl butyral.

The nematic liquid crystal layer 102 contains a liquid crystal material 116 or compound, which is mixed with the disclosed chiral dopant(s) 120, the nematic liquid crystal layer 102 being in the nematic phase rendering the window

100 transparent based on the irradiation A, such as visible light. The liquid crystal material 116 or compound itself is not particularly limited. Those known can be used, such as E7 and E44 by Merck.

Figure 2:
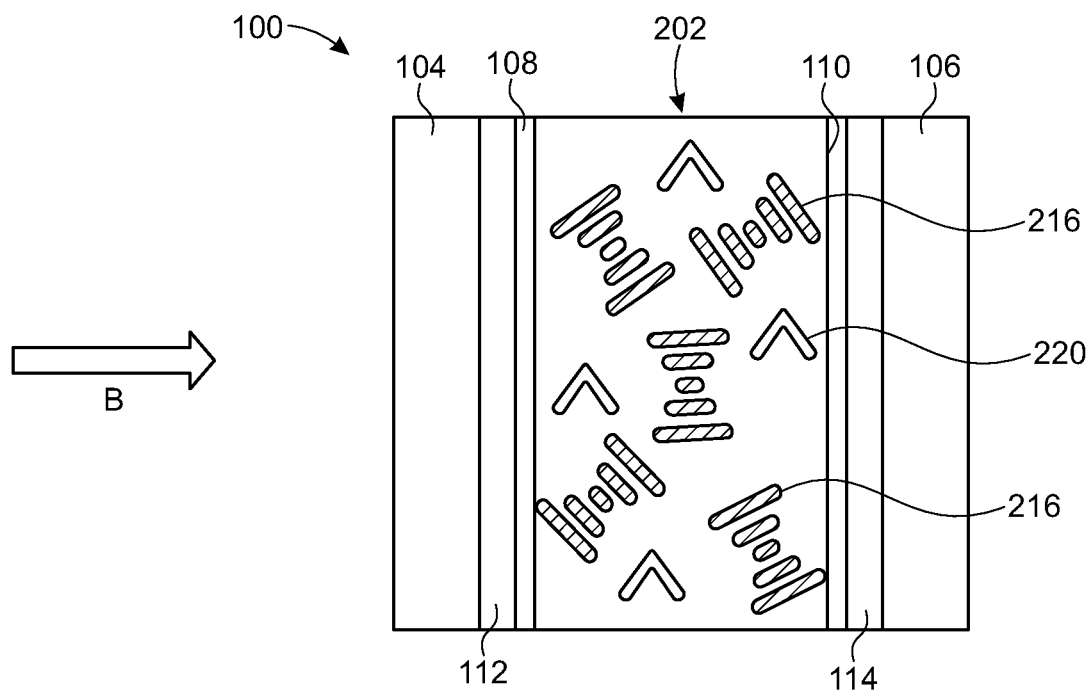
FIG. 2 is a schematic of the window of FIG. 1 having the liquid crystal layer between two glass panes, the liquid crystal layer containing the disclosed chiral dopant(s), the liquid crystal layer being in the cholesteric phase rendering the window opaque.

FIG. 2 is a schematic of the window 100 of FIG. 1 having the cholesteric liquid crystal layer 202 between the two glass panes 104, 106, resulting from the chiral dopant(s) 120 reacting from the irradiation B, such as ultraviolet light, activating the HTP of the chiral dopant(s) 220 to bend the liquid crystal 116 into a helical pattern 216, forming the cholesteric liquid crystal layer 202 which renders the window 100 opaque.

The chiral azobenzene dopants disclosed herein were developed specifically to increase the ΔHTP for applications in which the rate of conversion between transparent and opaque is critical. The resulting chiral azobenzene dopants have structural compositions that produce increased ΔHTP when compared to conventional chiral dopants.

A chiral azobenzene dopant as disclosed herein with increased HTP has a structure represented by the following formula (I):

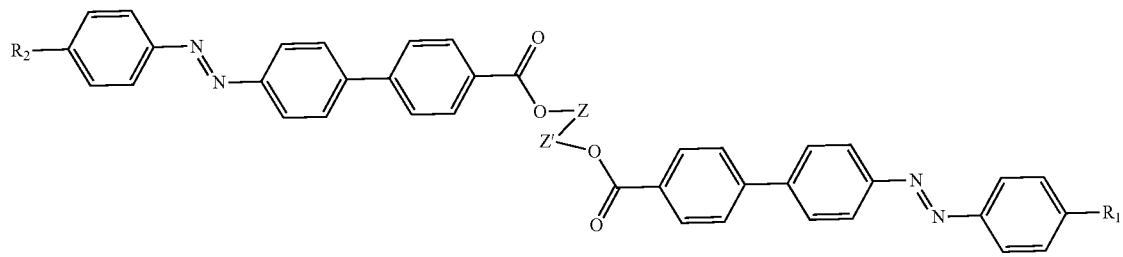

wherein Z and Z' are independently selected from the group consisting of naphthalene and phenanthrene. When Z or Z' is naphthalene, the naphthalene optionally has $R_3$ at the 6 position and $R_4$ at the 6' position. When Z or Z' is phenanthrene, the phenanthrene optionally has $R_3$ at the 7 position and $R_4$ at the 7' position. $R_1$, $R_2$, $R_3$, and $R_4$ are independently selected from the group consisting of an alkyl group having 1 to 20 carbons, an alkoxy group having 1 to 20 carbons, an aryl group having 6 to 20 carbons, and an aryloxy group having 6 to 20 carbons. For any one or more $R_1$, $R_2$, $R_3$, and $R_4$, on any $CH_2$, a $CH_3$ may optionally replace a hydrogen. "Independently selected" when used herein means that Z and Z' and $R_1$, $R_2$, $R_3$, and $R_4$ can all be the same, some can be the same, or all can be different.

The chiral azobenzene dopant may have the structure of formula (Ia):

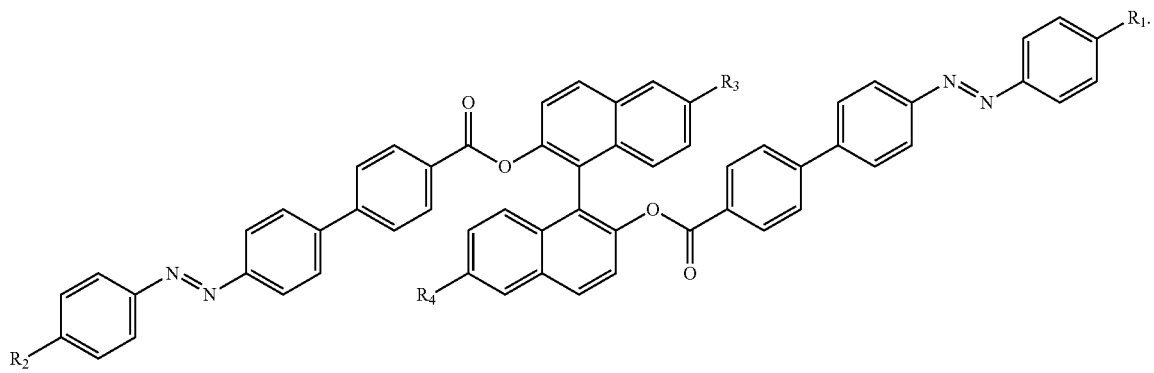

In formula (Ia), $R_1$ and $R_2$ may both be an alkyl group such as $C_8H_{17}$, as a non-limiting example, with optional $R_3$ and $R_4$ left unsubstituted, as shown in the structure below:

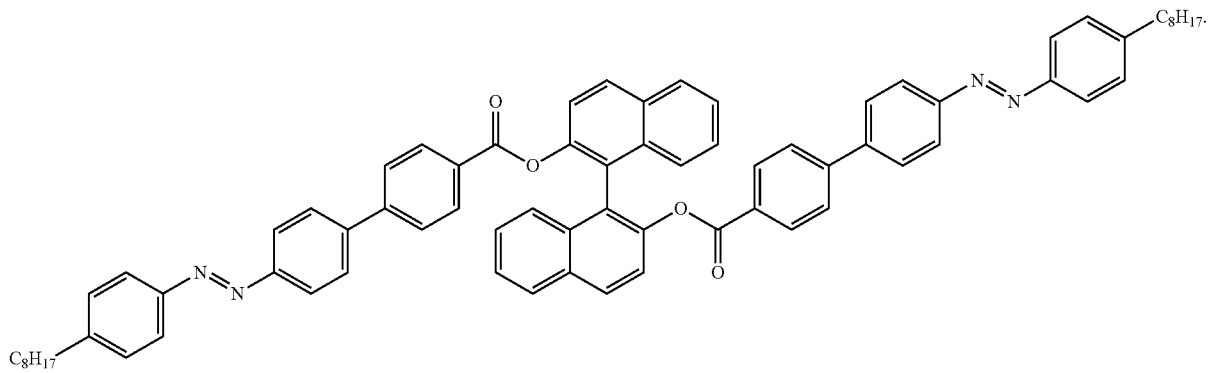

The above structure has the compound name [1,1'-binaphthalene]-2,2'-diyl bis(4'-((4-octylphenyl)diazenyl)-[1,1'-biphenyl]-4-carboxylate).

In formula (Ia), $R_1$ may be an alkyl group such as $C_8H_{17}$ and $R_2$ may be an alkoxyl group having eight carbons with a $CH_3$ replacing a hydrogen on the first C, as a non-limiting example, with optional $R_3$ and $R_4$ left unsubstituted, as shown in the structure below:

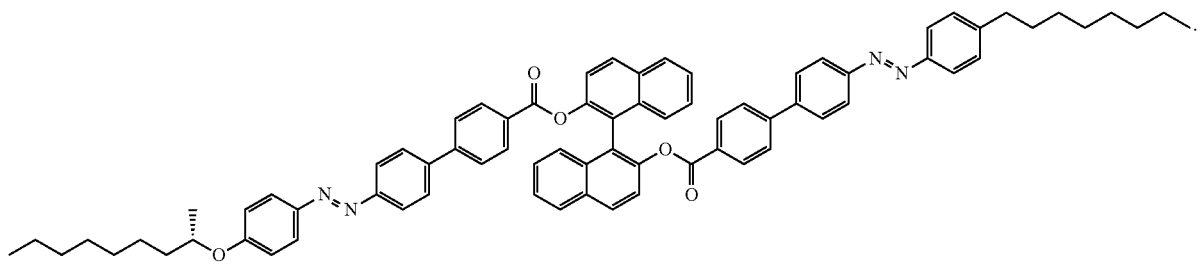

In formula (Ia), $R_1$ and $R_2$ may each be an alkoxyl group having seven carbons with a $CH_3$ replacing a hydrogen on the first C, as a non-limiting example, with optional $R_3$ and $R_4$ left unsubstituted, as shown in the structure below:

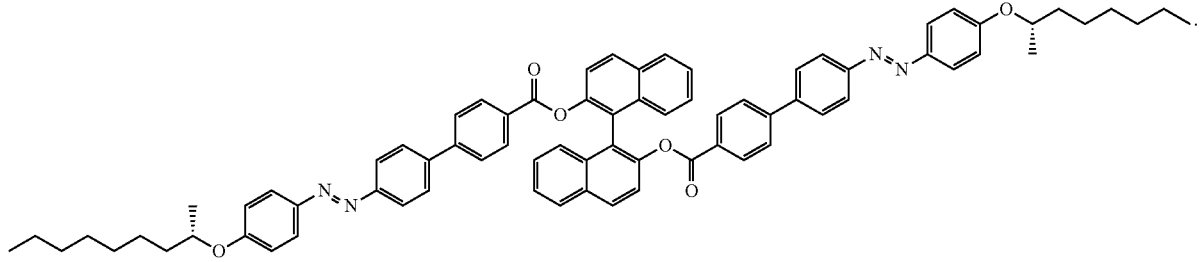 [SMILES: CCCCCCC[C@H](C)Oc1ccc(/N=N/c2ccc(-c3ccc(C(=O)Oc4ccc5ccccc5c4-c4c(OC(=O)c5ccc(-c6ccc(/N=N/c7ccc(O[C@@H](C)CCCCCC)cc7)cc6)cc5)ccc5ccccc45)cc3)cc2)cc1]

The above structure has the compound name 2'-((4'-((E)-(4-(((R)-octan-2-yl)oxy)phenyl)diazenyl)-[1,1'-biphenyl]-4-carbonyl)oxy)-[1,1'-binaphthalen]-2-yl 4'-((E)-(4-(((S)-octan-2-yl)oxy)phenyl)diazenyl)-[1,1'-biphenyl]-4-carboxylate.

In formula (Ia), $R_1$ and $R_2$ may each be an alkyl group such as $C_4H_9$ as a non-limiting example, with optional $R_3$ and $R_4$ left unsubstituted. The compound is [1,1'-binaphthalene]-2,2'-diyl bis(4'-((4-butylphenyl)diazenyl)-[1,1'-biphenyl]-4-carboxylate). The structure is below:

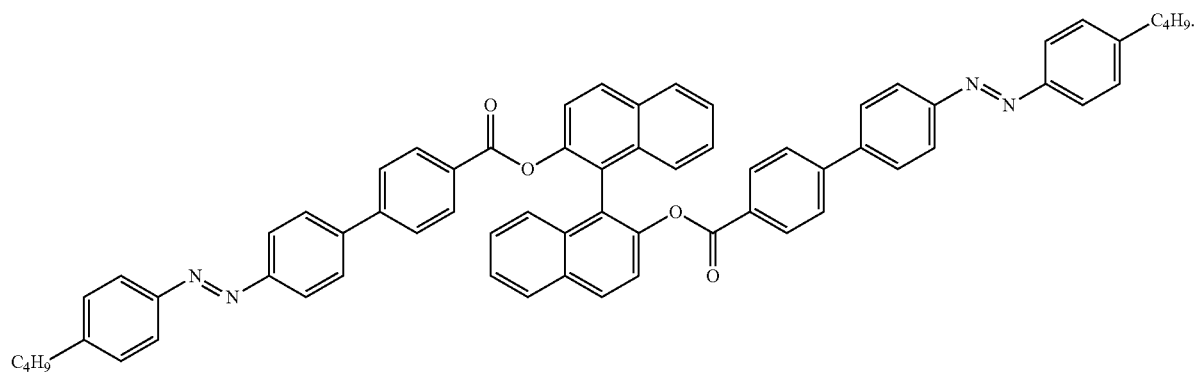

In formula (Ia), $R_1$ and $R_2$ may each be an alkyl group such as $C_8H_{17}$ and $R_3$ and $R_4$ may each be an alkoxyl group having eight carbons with a $CH_3$ replacing a hydrogen on the first C, as a non-limiting example, as shown in the structure below:

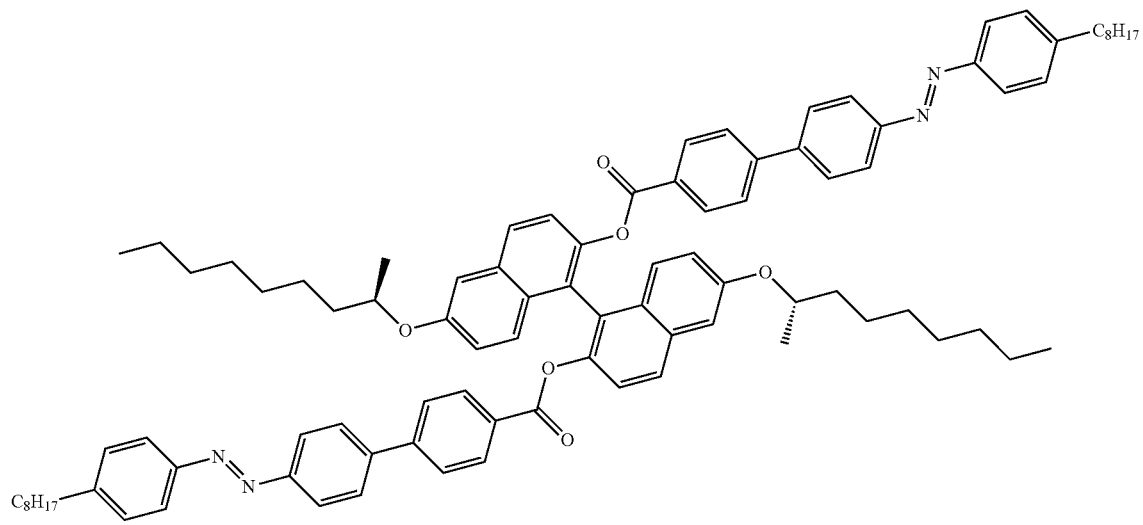

In formula (Ia), $R_1$ and $R_2$ may each be an alkoxy group such as O—$C_7H_{15}$, with the compound name [1,1'-binaphthalene]-2,2'-diyl bis(4'-((E)-(4-(heptyloxy)phenyl)diazenyl)-[1,1'-biphenyl]-4-carboxylate).

The chiral azobenzene dopant may have the structure of formula (Ib):

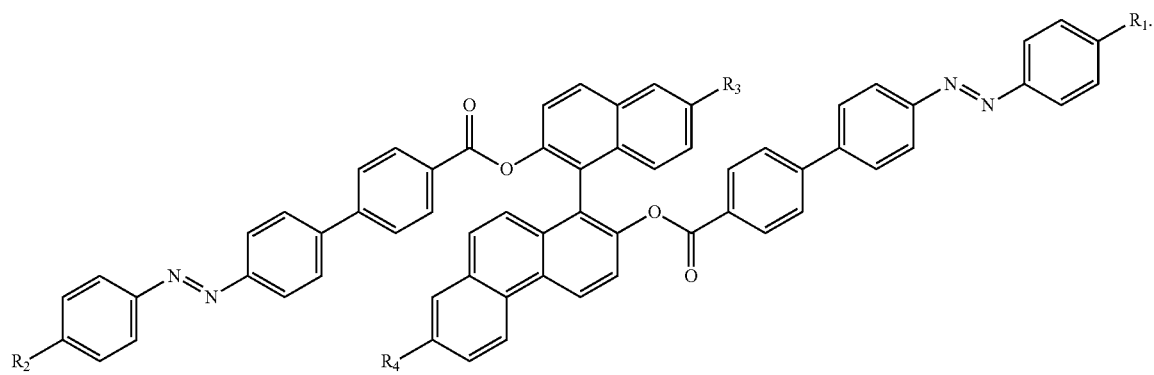

In formula (Ib) above, $R_1$ and $R_2$ may both be an alkoxy group such as $O-C_7H_{15}$, as a non-limiting example, with optional $R_3$ and $R_4$ left unsubstituted. The compound name is 1-(2-((4'-((E)-(4-(heptyloxy)phenyl)diazenyl)-[1,1'-biphenyl]-4-carbonyl)oxy) naphthalen-1-yl) phenanthren-2-yl 4'-((E)-(4-(heptyloxy)phenyl)diazenyl)-[1,1'-biphenyl]-4-carboxylate.

The chiral azobenzene dopant may have the structure of formula (Ic):

atom from a single carbon atom of a parent alkane. Typical alkyl groups include, but are not limited to, methyl; ethyl; propyls such as propan-1-yl, propan-2-yl, etc.; butyls such as butan-1-yl, butan-2-yl, 2-methyl-propan-1-yl, 2-methyl-propan-2-yl, etc.; and the like. In some aspects, an alkyl group comprises from 1 to 20 carbon atoms ($C_1$-$C_{20}$ alkyl). In other aspects, an alkyl group comprises from 1 to 10 carbon atoms ($C_1$-$C_{10}$ alkyl). In still other aspects, an alkyl group comprises from 1 to 6 carbon atoms ($C_1$-$C_6$ alkyl).

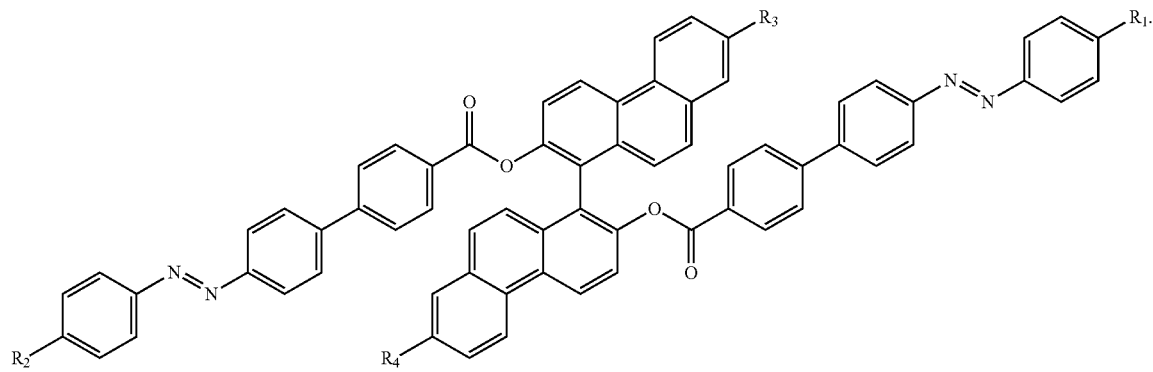

In formula (Ic) above, $R_1$ and $R_2$ may both be an alkoxy group such as $O-C_7H_{15}$, as a non-limiting example, with optional $R_3$ and $R_4$ left unsubstituted. The compound name is [1,1'-biphenanthrene]-2,2'-diyl bis(4'-((E)-(4-(heptyloxy)phenyl)diazenyl)-[1,1'-biphenyl]-4-carboxylate).

In formula (Ic) above, $R_1$ and $R_2$ may both be an alkyl group and $R_3$ and $R_4$ may each be an alkoxyl group having eight carbons with a $CH_3$ replacing a hydrogen on the first C, as a non-limiting example, as shown in the structure below:

"Alkenyl," by itself or as part of another substituent, refers to an unsaturated branched, straight-chain having at least one carbon-carbon double bond derived by the removal of one hydrogen atom from a single carbon atom of a parent alkene. The group may be in either the cis or trans conformation about the double bond(s). Typical alkenyl groups include, but are not limited to, ethenyl; propenyls such as prop-1-en-1-yl, prop-1-en-2-yl, prop-2-en-1-yl (allyl), prop-2-en-2-yl, cycloprop-1-en-1-yl; cycloprop-2-en-1-yl; butenyls such as but-1-en-1-yl, but-1-en-2-yl, 2-methyl-prop-1-

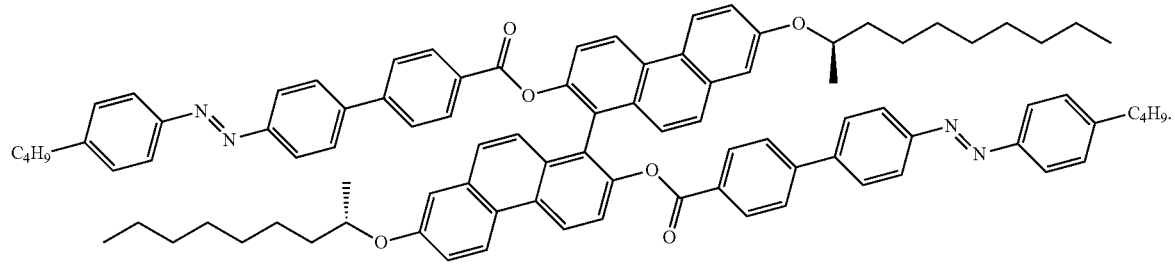

The compound name is 7-(((R)-nonan-2-yl)oxy)-7'-(((S)-nonan-2-yl)oxy)-[1,1'-biphenanthrene]-2,2'-diyl bis(4'-((4-butylphenyl)diazenyl)-[1,1'-biphenyl]-4-carboxylate). As noted, $R_1$-$R_4$ can be independently selected from the group consisting of an alkyl group having 1 to 20 carbons, an alkoxy group having 1 to 20 carbons, an aryl group having 6 to 20 carbons, and an aryloxy group having 6 to 20 carbons, and on any one or more $R_1$, $R_2$, $R_3$, and $R_4$, a $CH_3$ is optionally attached by replacing a hydrogen of a $CH_2$. It is further contemplated that R1-R4 may also be independently selected from an alkenyl or an alkynyl having 2 to 20 carbons, and on any one or more $R_1$, $R_2$, $R_3$, and $R_4$, a $CH_3$ is optionally attached by replacing a hydrogen of a $CH_2$.

"Alkyl," by itself or as part of another substituent, refers to a saturated, branched, or straight-chain monovalent hydrocarbon radical derived by the removal of one hydrogen en-1-yl, but-2-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, etc.; and the like. In some aspects, an alkenyl group comprises from 2 to 20 carbon atoms ($C_2$-$C_{20}$ alkenyl). In other aspects, an alkenyl group comprises from 2 to 10 carbon atoms ($C_2$-$C_{10}$ alkenyl). In still other aspects, an alkenyl group comprises from 2 to 6 carbon atoms ($C_2$-$C_6$ alkenyl).

"Alkynyl," by itself or as part of another substituent refers to an unsaturated branched, straight-chain having at least one carbon-carbon triple bond derived by the removal of one hydrogen atom from a single carbon atom of a parent alkyne. Typical alkynyl groups include, but are not limited to, ethynyl; propynyls such as prop-1-yn-1-yl, prop-2-yn-1-yl, etc.; butynyls such as but-1-yn-1-yl, but-1-yn-3-yl, but-3-yn-1-yl, etc.; and the like. In some aspects, an alkynyl group comprises from 2 to 20 carbon atoms ($C_2$-$C_{20}$ alkynyl). In other aspects, an alkynyl group comprises from 2 to 10 carbon atoms ($C_2$-$C_{10}$ alkynyl). In still other aspects, an alkynyl group comprises from 2 to 6 carbon atoms ($C_2$-$C_6$ alkynyl).

"Alkoxy," by itself or as part of another substituent, refers to a radical of the formula —O—R, where R is alkyl, alkenyl or alkynyl as defined herein.

"Aryl," by itself or as part of another substituent, refers to a monovalent aromatic hydrocarbon group derived by the removal of one hydrogen atom from a single carbon atom of a parent aromatic ring system, as defined herein. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene and the like. In some embodiments, an aryl group comprises from 6 to 20 carbon atoms ($C_6$-$C_{20}$ aryl). In other embodiments, an aryl group comprises from 6 to 15 carbon atoms ($C_6$-$C_{15}$ aryl). In still other embodiments, an aryl group comprises from 6 to 15 carbon atoms ($C_6$-$C_{10}$ aryl).

"Aryloxy," by itself or as part of another substituent, refers to a radical of the formula —O—R, where R is aryl as defined herein.

Table 1 below compares the ΔHTP of two of the novel chiral azobenzene dopants disclosed herein with a known compound. The ΔHTP of the two disclosed compounds are 36 [μm−1 g−1 gE44] and 39 [μm−1 g−1 gE44], respectively, while the known compound has a ΔHTP of only 28 [μm−1 g−1 gE44]. This is a significant improvement, resulting in reduced time for conversion between transparency and opacity. It is worthwhile noting that the inventors targeted a ΔHTP of 40 [μm−1 g−1 gE44] for certain applications such as windshields when developing the compounds.

TABLE 1

| Compound | HTP_trans (before UV) [μm-1 g-1 gE44] | HTP_cis (after UV) [μm-1 g-1 gE44] | ΔHTP [μm-1 g-1 gE44] |
|---|---|---|---|
| 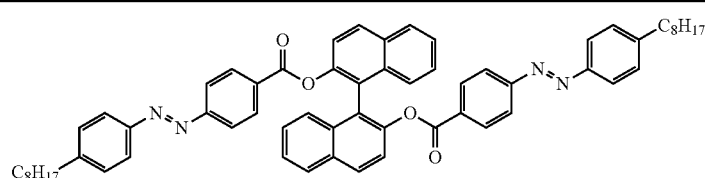 Compound A | 58 68 | 30 32 | 28 36 |
| 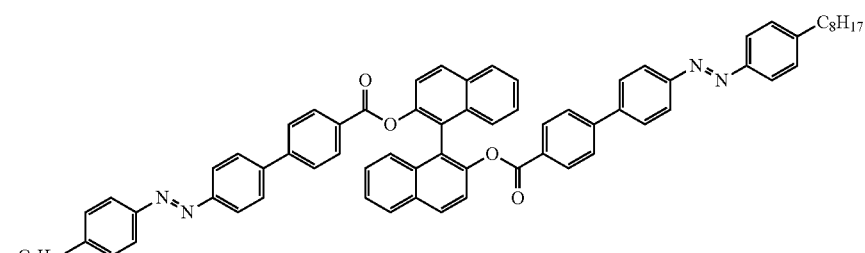 Compound B | 76 | 37 | 39 |
| 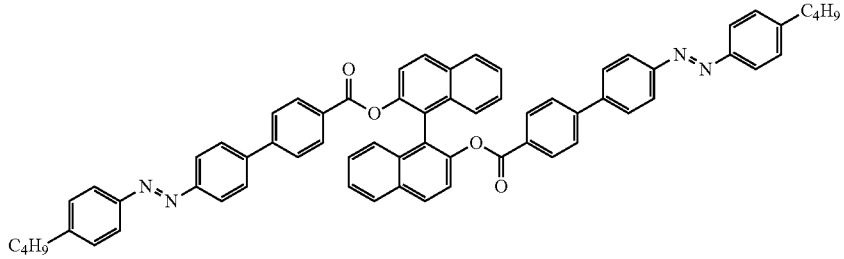 | | | |

Generally, chiral azobenzene compounds are synthesized by cross-coupling reaction of binaphthyl-carboxylic acid derivative (Compound I below) with azobenzene derivatives (Compound II below). R is $R_1$-$R_2$ as defined herein.

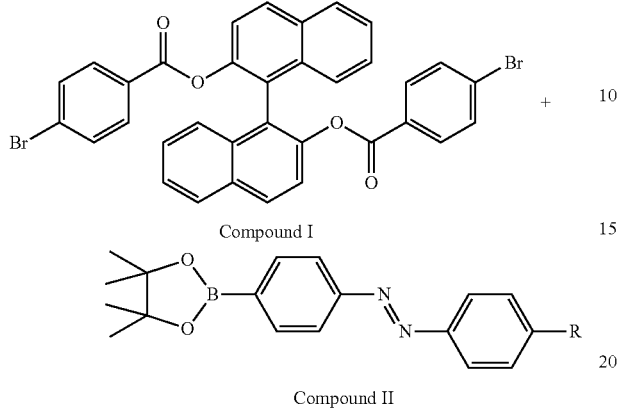

Compound I

Compound II

For the synthesis of Compound A ([1,1'-binaphthalene]-2,2'-diyl bis(4'-((4-octylphenyl)diazenyl)-[1,1'-biphenyl]-4-carboxylate) in the table above:

1,1'-Binaphthyl-2,2'-carboxylic acid derivative (compound(2-3)) was obtained by esterification of (R)-(+)-1,1'-Bi-2-naphthol (compound(2-1)) with 4-Bromobenzoyl Chloride (compound(2-2)).

Compound(2-6) was obtained by diazo coupling reaction of 4-Buromoaniline(compound(2-4)) with 4-n-Ocutylaniline(2-5).

Compound(2-6) reacted with 4,4,5,5-Tetramethyl-1,3,2-dioxaborolane(compound(2-7)) to produce azobenzene derivative(compound(2-8)).

Chiral azobenzene compound(Compound A) was synthesized by cross-coupling reaction of binaphthyl-carboxylic acid derivative (compound(2-3)) with azobenzene derivatives (compound(2-8)).

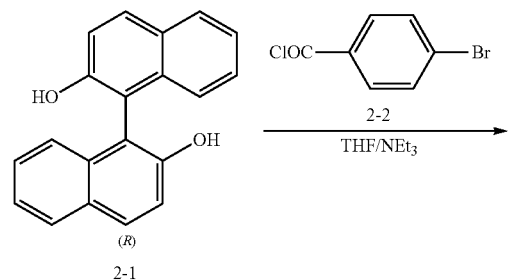

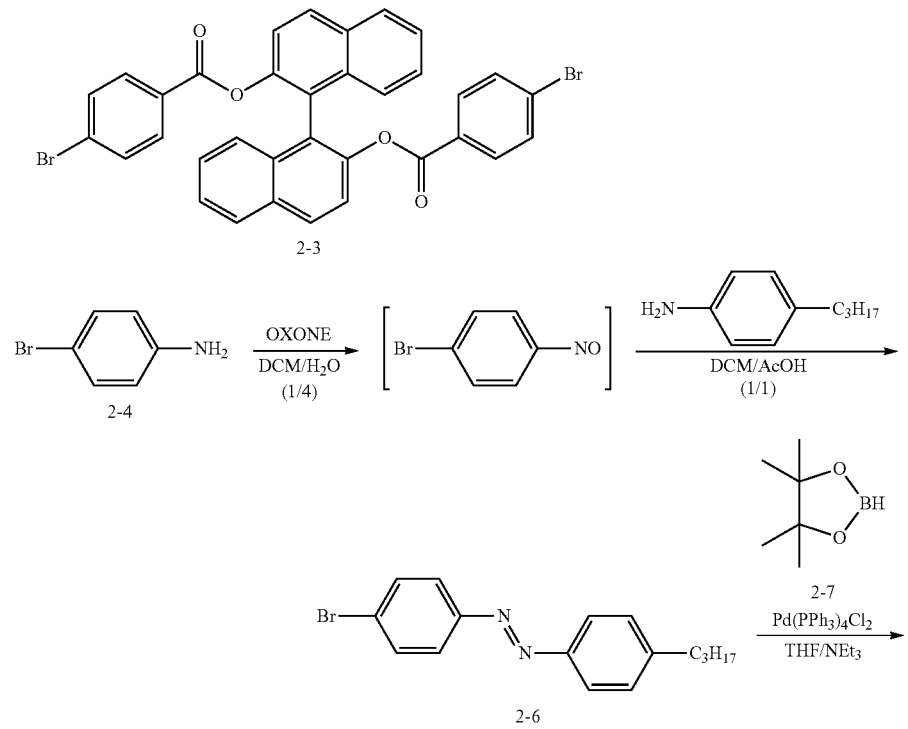

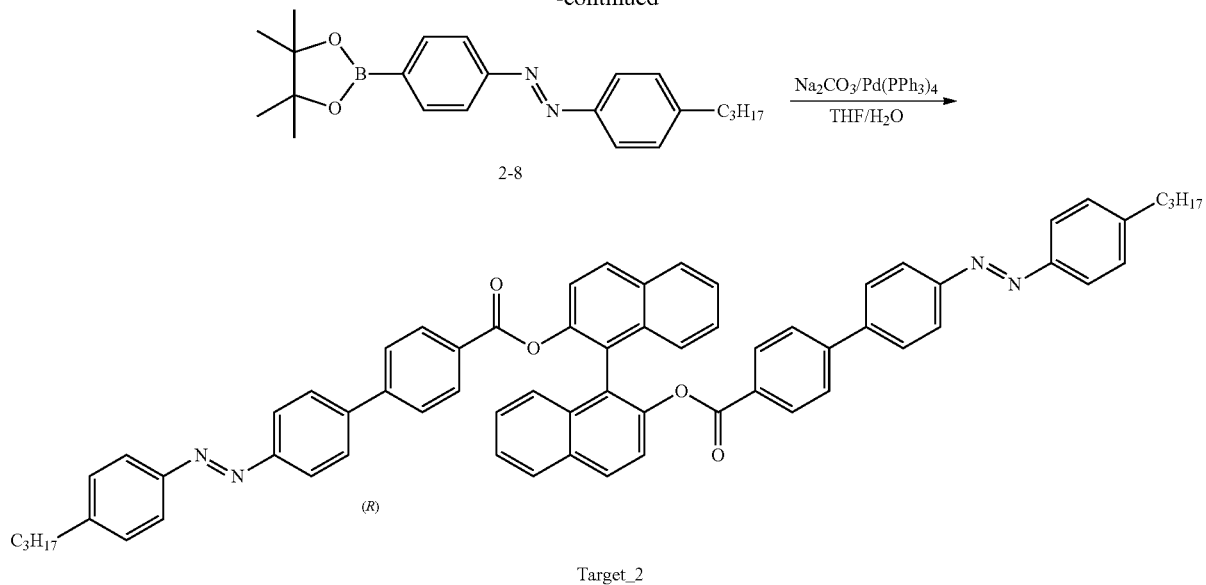

For the synthesis of Compound B ([1,1'-binaphthalene]-2,2'-diyl bis(4'-((4-butylphenyl)diazenyl)-[1,1'-biphenyl]-4-carboxylate) in the table above:

1,1'-Binaphthyl-2,2'-carboxylic acid derivative (compound(1-3)) was obtained by esterification of (R)-(+)-1,1'-Bi-2-naphthol(compound(1-1)) with 4-Bromobenzoyl Chloride(compound(1-2)).

Azobenzene derivative(compound(1-6)) was obtained by diazo coupling reaction of 4-Butylaniline(compound (1-4)) with 4-Aminophenylboronic acid pinacol ester (compound(1-5)).

Chiral azobenzene compound(Compound B) was synthesized by cross-coupling reaction of binaphthyl-carboxylic acid derivative (compound(1-3)) with azobenzene derivative (compound(1-6)).

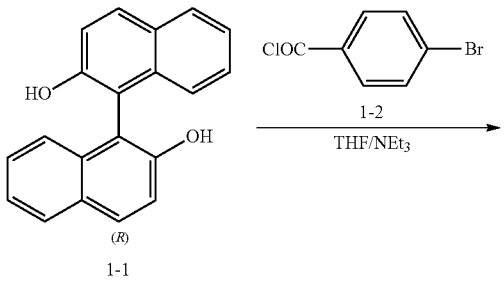

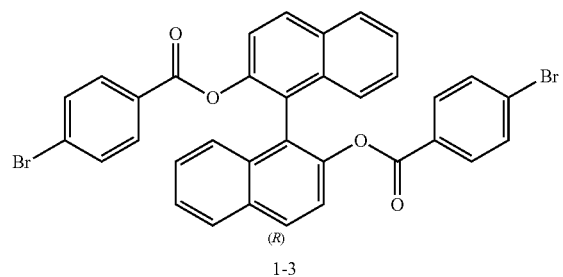

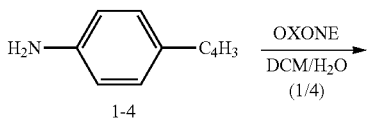

-continued

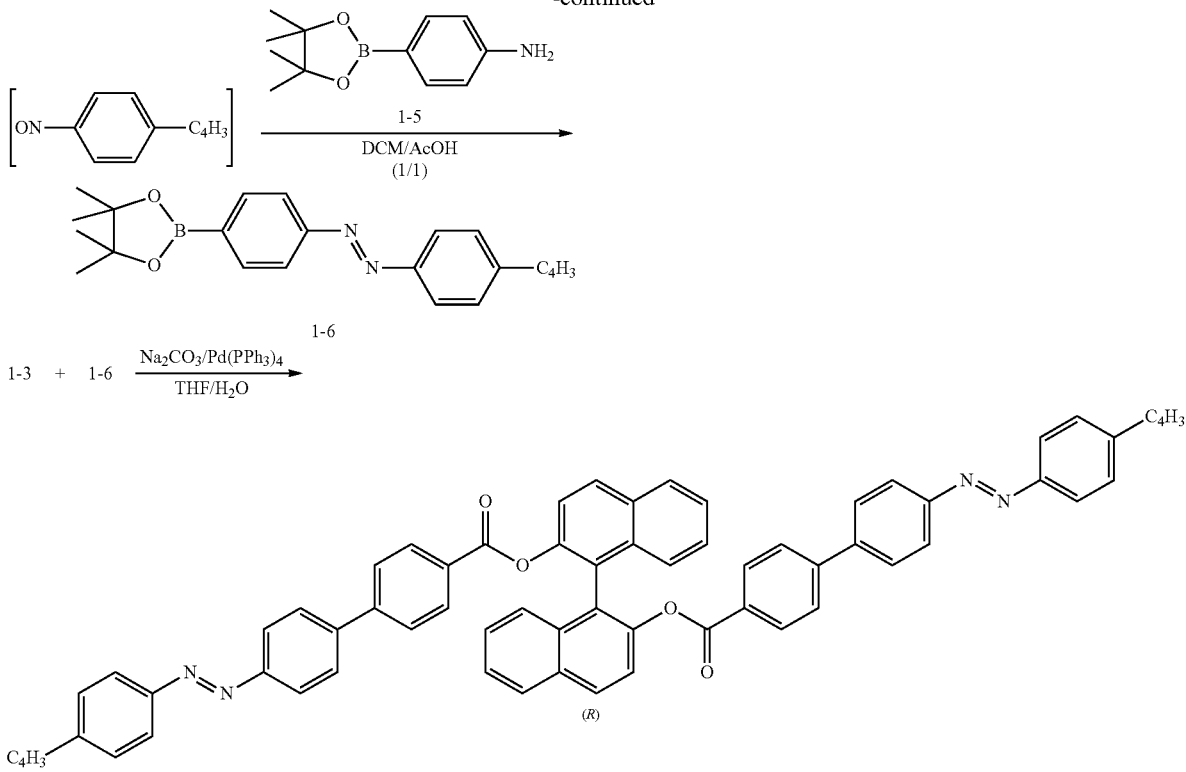

HTP values of chiral azobenzene were measured by using Cano wedge method.

Each chiral azobenzene is mixed into liquid crystal (Tsukasa Kaken, Sb-826010(E44)).

The mixture was loaded into the wedge cell by capillary action at room temperature.

The disclination lines of the cholesteric liquid crystal in the wedge cell are investigated through a polarizing optical microscope. The pitch was determined according to the equation $P=2R \tan \theta$, where R represents the distance between the defect lines and $\theta$ is the wedge angle of wedge cells (EHC, KCRK-03, $\tan \theta = 0.0079$). HTP value is calculated from the equation $HTP=1/(PC)$, where C represents concentration of the chiral dopant such as g per g E44. HTP values of chiral azobenzene on trans state were measured after blue light irradiation on wedge cell. Blue light source was THORLAB M450LP1. Wavelength of the blue light was 450 nm, irradiation intensity was 20 mW/cm$^2$ and irradiation time was 60 seconds. HTP values of chiral azobenzene on cis state were measured after UV light irradiation on wedge cell. UV light source was THORLAB M365LP1-C1. Wavelength of the blue light was 365 nm, irradiation intensity was 20 mW/cm$^2$ and irradiation time was 60 seconds. ΔHTP value is the difference between HTP of chiral azobenzene on trans state and that of on cis state.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A chiral azobenzene dopant with helical twisting power, the chiral dopant having a structure represented by the following formula (I):

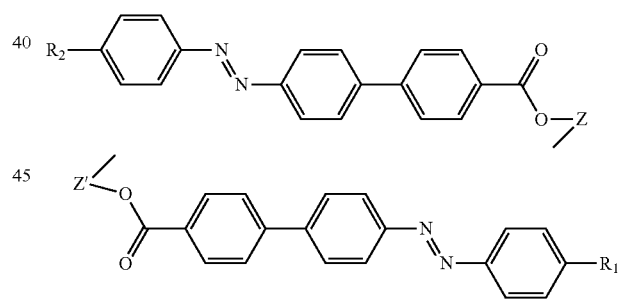

wherein Z and Z' are independently selected from the group consisting of naphthalene and phenanthrene;

when Z or Z' is naphthalene, the naphthalene optionally has $R_3$ at the 6 position and $R_4$ at the 6' position;

when Z or Z' is phenanthrene, the phenanthrene optionally has $R_3$ at the 7 position and $R_4$ at the 7' position;

$R_1$, $R_2$, $R_3$, and $R_4$ are independently selected from the group consisting of an alkyl group having 1 to 20 carbons, an alkoxy group having 1 to 20 carbons, an aryl group having 6 to 20 carbons, and an aryloxy group having 6 to 20 carbons; and on any one or more $R_1$, $R_2$, $R_3$, and $R_4$, a $CH_3$ is optionally attached by replacing a hydrogen of a $CH_2$.

2. The chiral azobenzene dopant of claim 1, wherein the chiral dopant has a structure of formula (Ia):

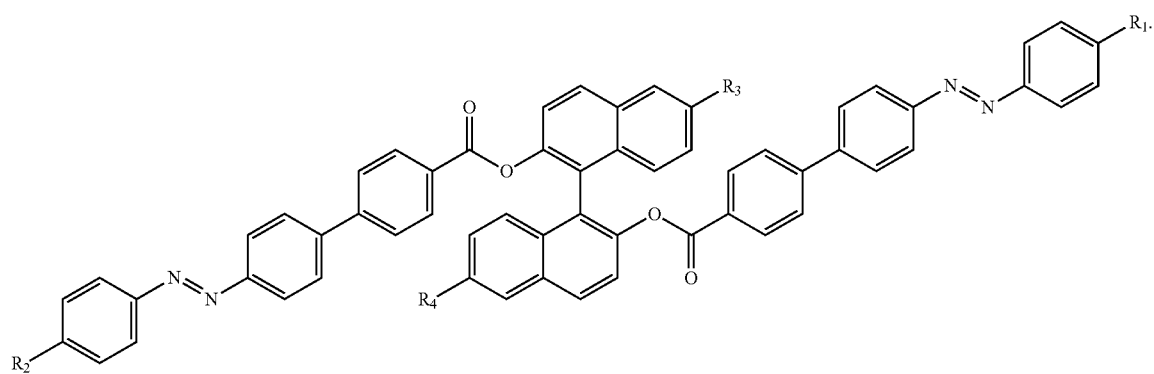
3. The chiral azobenzene dopant of claim 2, having the following structure:
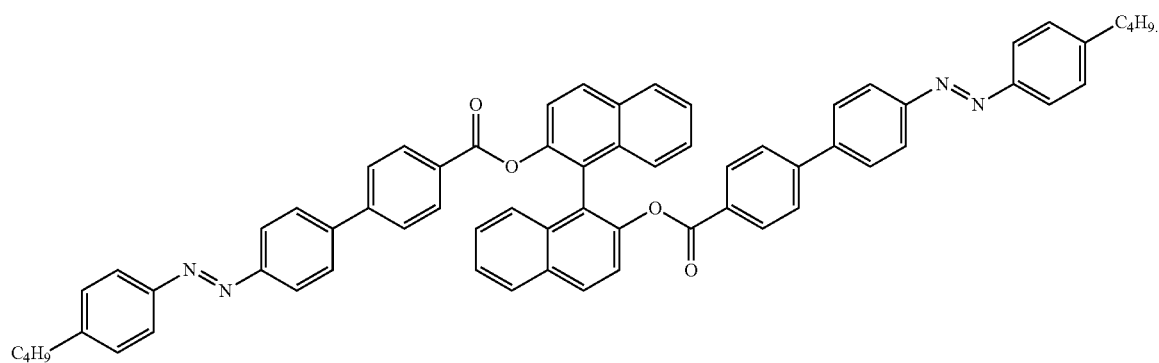
4. The chiral azobenzene dopant of claim 2, having the following structure:
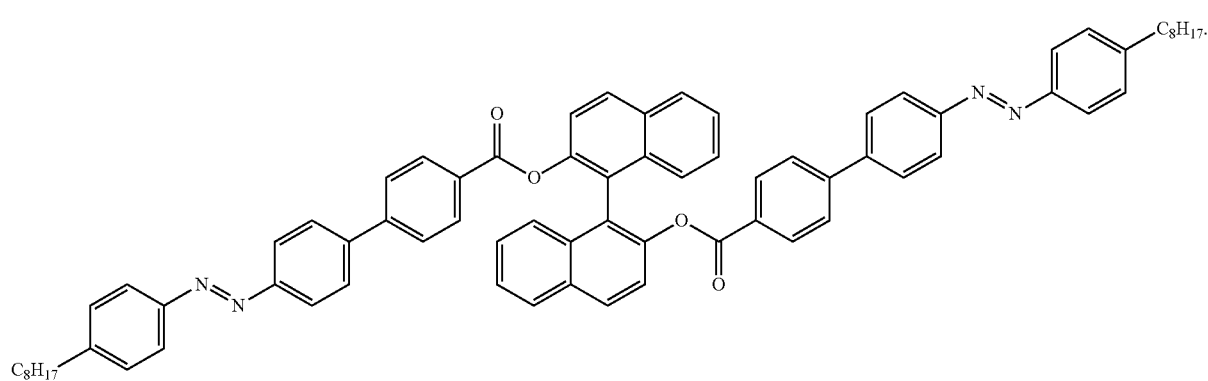
5. The chiral azobenzene dopant of claim 2, having the following structure:

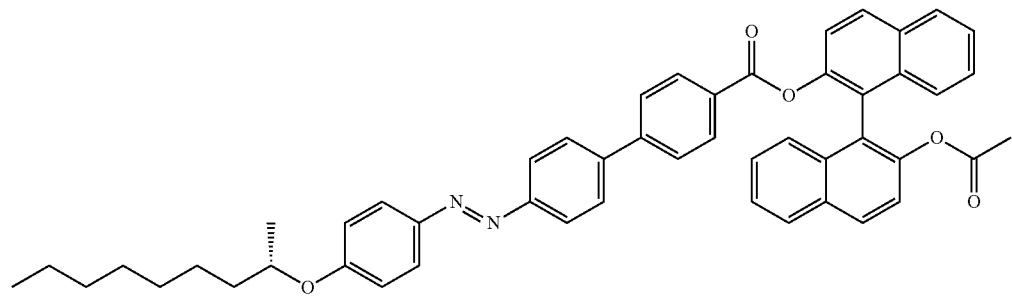
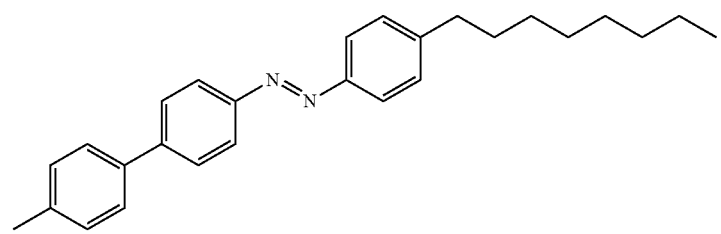
6. The chiral azobenzene dopant of claim 2, having the following structure:
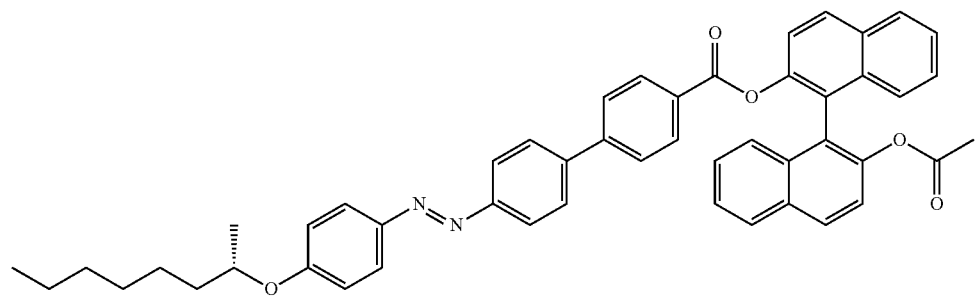
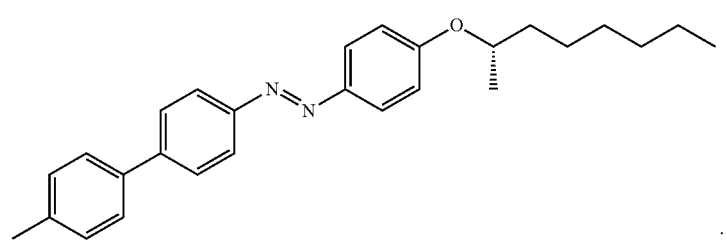
7. The chiral azobenzene dopant of claim 2, having the following structure:

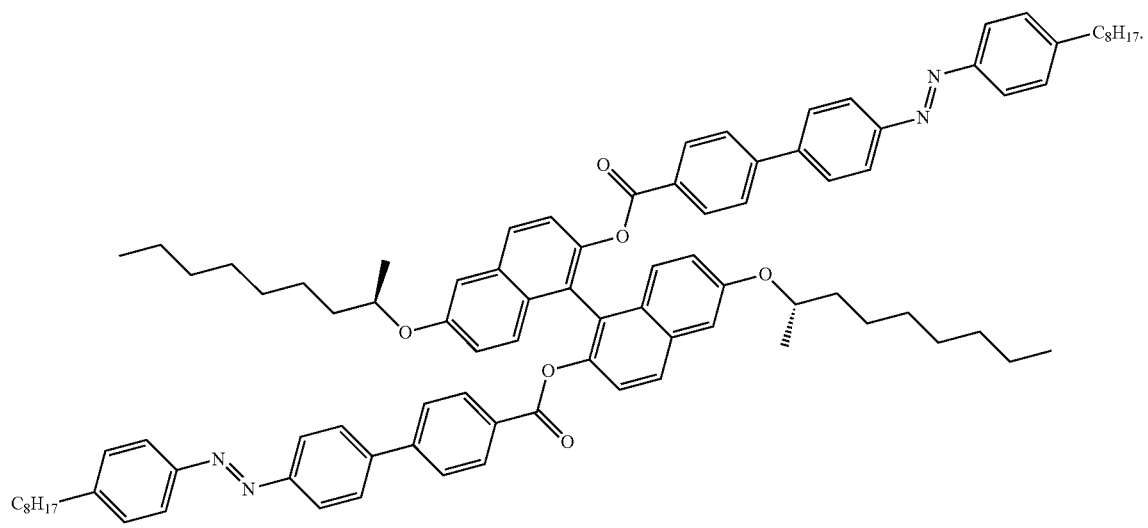
8. The chiral azobenzene dopant of claim 1, wherein the chiral dopant has a structure of formula (Ib)
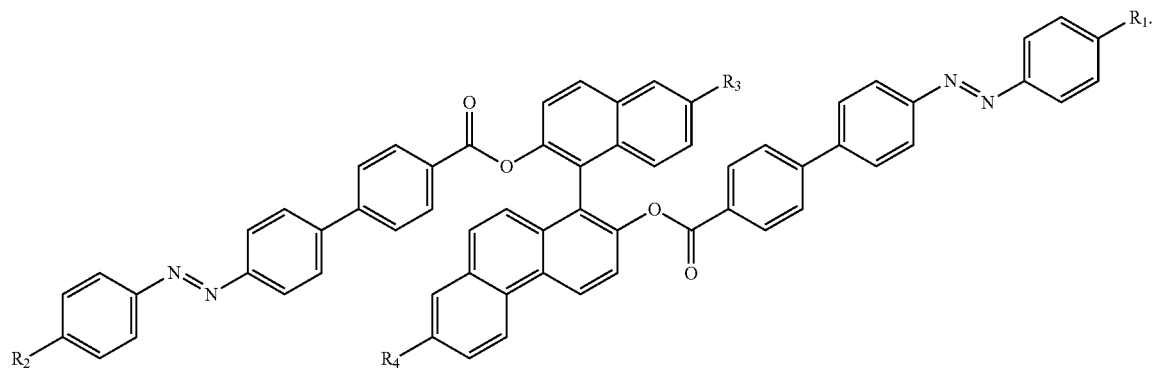
9. The chiral azobenzene dopant of claim 1, wherein the chiral dopant has a structure of formula (Ic):
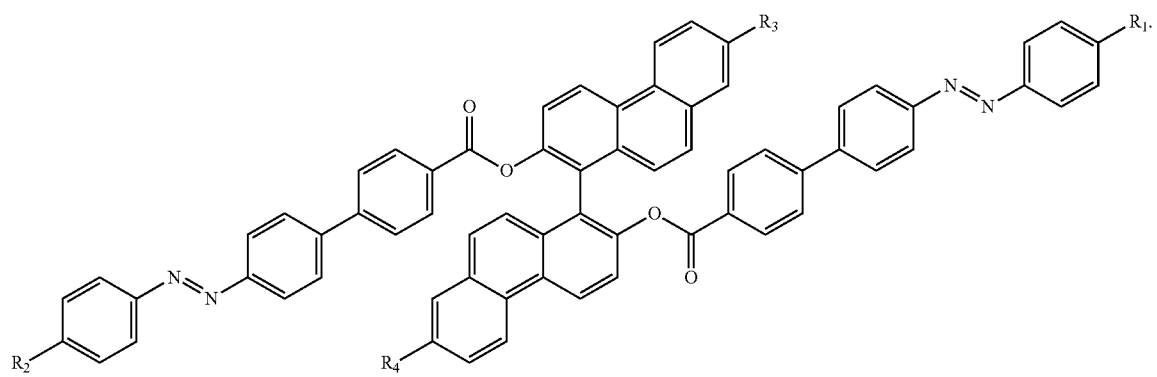
10. The chiral azobenzene dopant of claim 9, having the following formula:

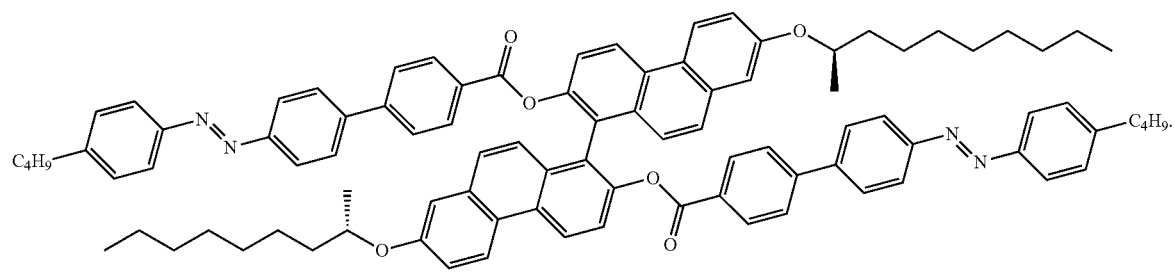

11. A liquid crystal layer comprising a liquid crystal material and the chiral azobenzene dopant of claim 1.

12. The liquid crystal layer of claim 11, wherein the liquid crystal material is reversibly adjustable between transparent and opaque by irradiation.

13. The liquid crystal layer of claim 11, wherein the irradiation is with a visible light and an ultraviolet light, respectively.

* * * * *